United States Patent Office 2,797,220
Patented June 25, 1957

2,797,220

SUBSTITUTED PARAXANTHINES

Frederick F. Blicke, Washtenaw County, Mich., assignor to Regents of the University of Michigan, Ann Arbor, Mich., a corporation of Michigan No Drawing. Application December 2, 1954, Serial No. 472,779

4 Claims. (Cl. 260—254)

This invention relates to a novel class of compounds having interesting and useful physiological properties. More specifically, the invention relates to substituted paraxanthines and the methods for their preparation.

It has now been found that a new class of valauble compounds can be prepared. These compounds have the structure:

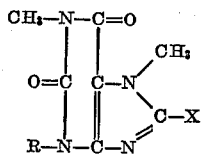

wherein R is an aliphatic hydrocarbon radical having at least three (3) carbon atoms and X is a halogen atom. A preferred class of these compounds are those wherein the R substituent has from three (3) to five (5) carbon atoms and X is a chlorine atom.

The new compounds are useful in the treatment of mammilary animals, producing diuresis and otherwise stimulating the circulatory and nervous systems of the animals.

The new compounds may be prepared by the alkylation of 8-chloroparaxanthine using alkyl halides in the presence of caustic alkali and ethanol. The desired product may then be separated from the reaction mixture by solvent extraction and crystallization.

Further details in the preparation of the new compounds are set forth with respect to the following specific examples.

Example 1

A glass reaction flask was charged with 12 g. of 8-chloroparaxanthine and a solution of 4.2 g. of potassium hydroxide in 100 cc. of 95 percent ethanol. The mixture was heated on a steam bath with an added amount of water sufficient to completely dissolve the reaction mixture. A stoichiometric proportion of n-butyl bromide (8.2 g.) was added and the mixture was heated at 100° C. for 24 hours in a sealed vessel. The reaction mixture was then made basic with the required amount of 10 percent potassium hydroxide. The resulting solution was extracted with chloroform and the extract dried over magnesium sulfate, freed of solvent under reduced pressure, and recrystallized from aqueous ethanol. A substantial yield of 3-n-butyl 8-chloroparaxanthine was recovered.

Example 2

Using the procedure of Example 1 except substituting allyl bromide, n-propyl bromide, isobutyl bromide or n-amyl bromide, the following homologues of chlorocaffeine are produced:

3-allyl-8-chloroparaxanthine
3-propyl-8-chloroparaxanthine
3-amyl-8-chloroparaxanthine
3-isobutyl-8-chloroparaxanthine Example 3

The value of the new compounds as diuretics was studied with dogs and the effect of the compounds was measured as the increase in urine. The observed data for the new compounds and homologous compounds are set forth in the following table.

| | cc./kg./3 hours |
|---|---|
| 3-butyl-8-chloroparaxanthine | 1.12 |
| 3-allyl-8-chloroparaxanthine | 1.57 |
| 3-methyl-8-chloroparaxanthine | 0.25 |
| 3-ethyl-8-chloroparaxanthine | 0.28 |

It will be noticed that the increase in the length of the aliphatic substituent to three (3) carbon atoms causes an increase in diuretic activity.

What is claimed is:

1. New chemical compounds of the group consisting of 3-allyl-8-chloroparaxanthine and 3-butyl-8-chloroparaxanthine.

2. The method of preparing 3-substituted 8-chloroparaxanthines which comprises heating 8-chloroparaxanthine in the presence of an aliphatic chloride of the group consisting of allyl chloride and butyl chloride.

3. The compound 3-n-butyl-8-chloroparaxanthine.

4. The compound 3-allyl-8-chloroparaxanthine.

References Cited in the file of this patent

McCorquodale: J. Am. Chem. Soc. 51, 2245-2251 (1929).

Beilstein: Handbuch der Organischen Chemie, vol. 26, 2nd supplement (zweites erganzungswerke) pp. 276-277.